(No Model.)
L. H. BRUNEMEYER.
DEVICE FOR ATTACHING PNEUMATIC TIRES TO WHEEL RIMS.
No. 519,695. Patented May 15, 1894.
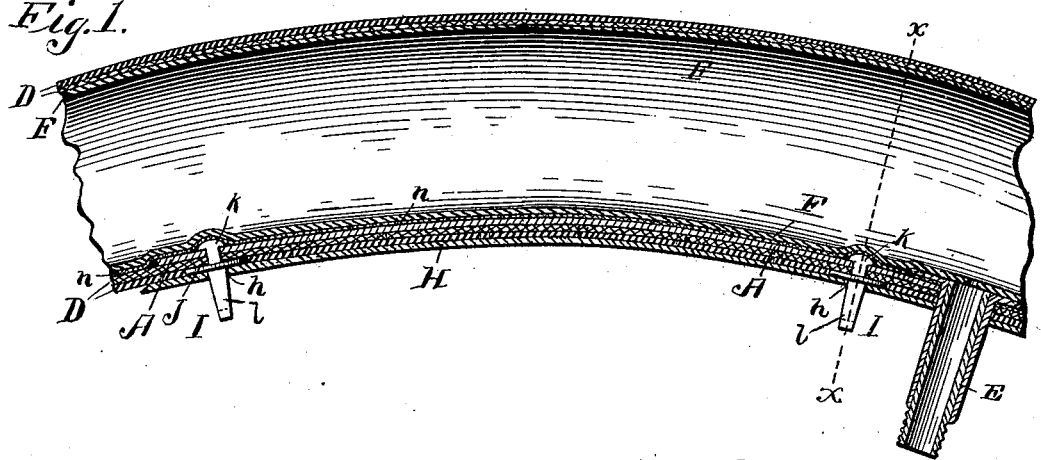
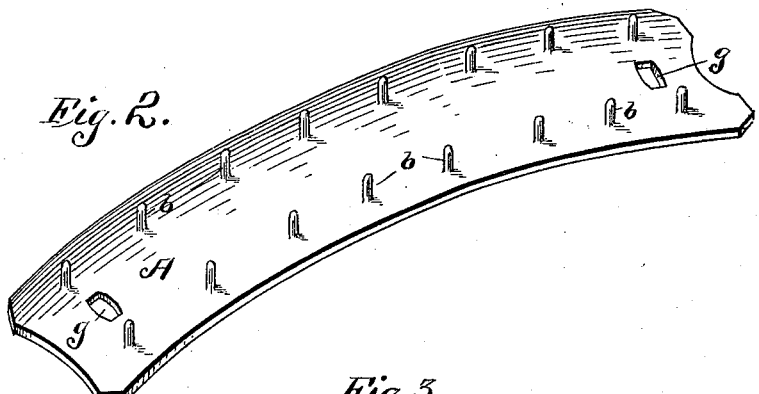
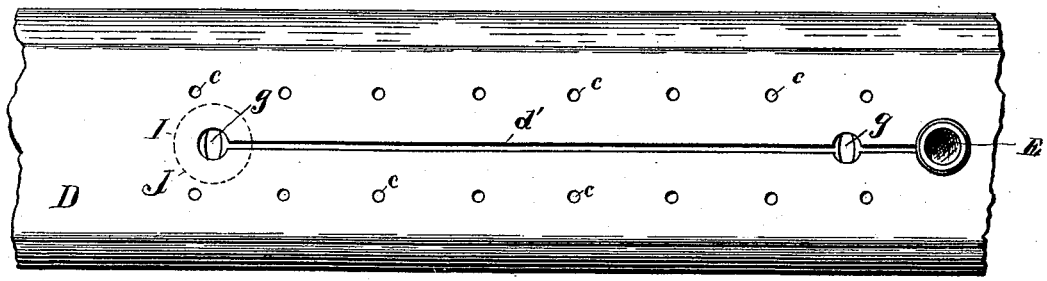
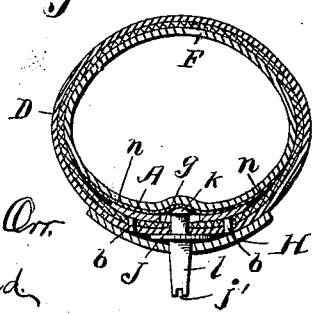
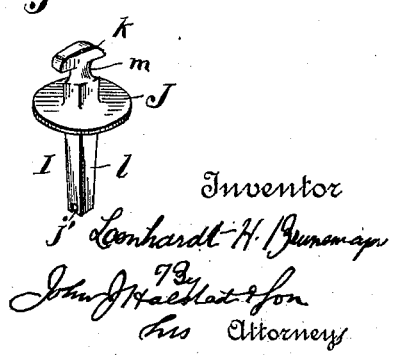
Witnesses
Howard D. Orr
H. S. Shepard
Inventor
Leonhardt H. Brunemeyer
John J. Halstead & Son
his Attorneys

UNITED STATES PATENT OFFICE.

LEONHARDT H. BRUNEMEYER, OF AURORA, ILLINOIS.

DEVICE FOR ATTACHING PNEUMATIC TIRES TO WHEEL-RIMS.

SPECIFICATION forming part of Letters Patent No. 519,695, dated May 15, 1894.

Application filed February 20, 1894. Serial No. 500,907. (No model.)

*To all whom it may concern:*

Be it known that I, LEONHARDT H. BRUNEMEYER, of Aurora, in the county of Kane and State of Illinois, have invented certain new and useful Improvements in Devices for Fastening Pneumatic Tires to the Rims of Wheels of Bicycles or other Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to the fastening of a pneumatic tire of a bicycle or other vehicle to the rim of the wheel; and it consists of certain novel devices, and which also prevent the "creeping" of the tire or of the inner rubber tube, and consequently preclude the forcing or straining of the inflating valve-tube against the wheel rim.

It is well known to expert bicyclers that most of the tires as now fastened, will "creep," and ultimately the valve tube becomes entirely cut off, or so impaired as to permit the air to leak out and escape from the inflated tire.

In the accompanying drawings which serve to illustrate the principle of my invention, Figure 1. shows a longitudinal central section of a portion of a rubber tire, of the wheel rim, and my improved devices; Fig. 2. a plan of the inner metal plate, detached; Fig. 3. an under side view of a portion of the pneumatic tire detached from the rim of the wheel; Fig. 4. a detail, showing one of the studs which connect the metal plate to the rubber tire and to the wheel rim; and Fig. 5. a cross-section in the line *x. x.* of Fig. 1.

A. is a plate of any suitable material, having two rows of fixed pins *b.* corresponding with holes *c.* made in the outer rubber tube D. on each side of longitudinal slit *d'.* therein; and through this slit is passed the valve tube E. This plate should conform in shape to the curves of the tube D. and of the inner rubber tube F., and it is placed between these tubes; its pins *b.* being caused to enter the holes *c.* and thereby serving substantially or sufficiently to close the slit *d'.* of the outer tube, thus avoiding the need of and dispensing entirely with any lacing cords, strings, wire or similar means for closing the slit; such cords, strings, or wires being as is well known, not only perishable by their exposure to dirt, moisture, &c., but always liable to stretch, become untied, or to break.

At or near each end of the slit *d'.*, (and also at its center if desired,) holes *g.*, oblong in form, are made in the plate A., and square or irregular holes *h.* are made in the rim H of the wheel, for the reception of studs I. Each of these studs has a disk or flange *j.*, and at one side of such disk, a projecting part or pin *k.*, and at its opposite side a projecting part or pin *l.* The part *k.* of each stud is intended to enter one of the oblong holes *g.*, and by reason of the side notches *m.* in said part, and when so inserted and upon turning the stud a quarter-turn, the stud becomes locked to the plate A; the flange being of course outside of the outer tube. The outer projection or pin *l.* is made square or oblong, and when the studs are locked to place as above stated, these pins project outside the flanges and beyond the outer tube. These pins being square or oblong and preferably a little tapering, the studs can readily be unlocked by means of pinchers or small wrench or other simple means, by giving them a quarter turn; or by means of a screw-driver or knife-blade inserted in the slot *j'* made in its end. After the inner tube is inserted in the outer tube or cover, the plate A. is inserted through the slit *d'.* in the outer tube, the pins *b.* are inserted in the respective holes *c.*, from the inside of the outer tube, and the pins *k.* of the studs are inserted in the holes *g.* in the plate and then the stud is given a quarter-turn; then the plate is pushed to place and the pins *l.* pushed into the square or oblong holes *h.* in the rim. These holes in the rim conform to the shape of the body of the pins *l.* and so prevent the unlocking or turning of said pins. The plate A. and these pins are kept in place by the inflation of the inner tube. It will now be seen that "creeping" is impossible, and that the valve tube cannot be cut off or impaired; and that no leakage can ensue from any such cause; and that no cement is needed to hold the tire to the rim in case of emergency. If from any other cause, the valve in the valve-tube should leak, causing the tire to become limp or loose, the rider can easily repair it while on the road, as no strings or wire are needed. Besides these advantages, my improved novel device is much stronger and more reliable than any fastening known to me in which any lacing up by strings or wire is required. The inner tube, as is well known, is to be inflated with compressed air through the valve tube, and the outer and thicker tube serves to strengthen and protect the inner one, and also takes all the wear and tear. The valve-tube E is attached to the inner tube, and as is well known, the air is forced in to distend this inner tube. The valve-tube is generally made of metal, or partly of metal, and always has a metal valve, not necessary to be shown, by means of which the compressed air is retained within the inner tube F. A strip $n$ or strips of cloth or other material, may if desired be placed between the plate A. and the exterior of the inner tube.

I claim—

1. The described device for fastening together the tubular tire and the rim of a vehicle, consisting of a plate having two rows of pins, and having openings to receive studs, and of studs severally provided with a flange and with projections on opposite sides of such flange, one projection being adapted to lock with or be unlocked from the plate, and the other projection being adapted to enter holes in the rim of the wheel, all substantially as described.

2. In combination with a pneumatic tire, a longitudinal plate placed between the inner and outer rubber tubes, having rows of pins fitting in corresponding holes on each side of a slit in the outer tube, and having openings to receive locking studs,—and the flanged studs substantially as shown and described, each having at one side of the flange a projection adapted to be locked to such plate and at the other side of the flange a projection adapted to enter a hole in the rim of the vehicle.

LEONHARDT H. BRUNEMEYER.

Witnesses:
JOHN N. TITSWORTH,
CLINT. JACKSON.